United States Patent
Tanaka

(10) Patent No.: US 9,180,385 B2
(45) Date of Patent: Nov. 10, 2015

(54) COLD TRAP AND METHOD OF CONTROLLING COLD TRAP

(71) Applicant: SUMITOMO HEAVY INDUSTRIES, LTD., Tokyo (JP)

(72) Inventor: Hidekazu Tanaka, Tokyo (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 247 days.

(21) Appl. No.: 13/755,858

(22) Filed: Jan. 31, 2013

(65) Prior Publication Data

US 2013/0192277 A1    Aug. 1, 2013

(30) Foreign Application Priority Data

Jan. 31, 2012    (JP) ................. 2012-018835

(51) Int. Cl.
*B01D 8/00*    (2006.01)
(52) U.S. Cl.
CPC .................................. *B01D 8/00* (2013.01)
(58) Field of Classification Search
CPC ............ B01D 8/00; F04C 25/02; F04B 37/08
USPC .......................................... 62/55.5, 100, 268
See application file for complete search history.

(56) References Cited

U.S. PATENT DOCUMENTS

| | | | | |
|---|---|---|---|---|
| 3,175,373 A | * | 3/1965 | Holkeboer et al. | 62/268 |
| 3,410,100 A | * | 11/1968 | Carlson | 62/55.5 |
| 4,148,196 A | * | 4/1979 | French et al. | 62/55.5 |
| 4,667,477 A | * | 5/1987 | Matsuda et al. | 62/55.5 |
| 4,679,401 A | * | 7/1987 | Lessard et al. | 62/55.5 |
| 4,860,546 A | * | 8/1989 | Harvell et al. | 62/55.5 |
| 4,966,016 A | * | 10/1990 | Bartlett | 62/55.5 |
| 5,465,584 A | * | 11/1995 | Mattern-Klosson et al. | 62/55.5 |
| 5,537,833 A | * | 7/1996 | Matte et al. | 62/55.5 |
| 5,582,017 A | * | 12/1996 | Noji et al. | 62/55.5 |
| 5,651,667 A | * | 7/1997 | Sand et al. | 417/572 |
| 6,092,373 A | * | 7/2000 | Mundinger | 62/55.5 |
| 6,223,540 B1 | * | 5/2001 | Egermeier | 62/55.5 |
| 7,037,083 B2 | * | 5/2006 | O'Neil et al. | 417/53 |
| 2009/0266088 A1 | * | 10/2009 | Oikawa | 62/55.5 |

FOREIGN PATENT DOCUMENTS

JP    H06-058238 A    3/1994
JP    2009-262083 A    11/2009

* cited by examiner

*Primary Examiner* — Mohammad M Ali
(74) *Attorney, Agent, or Firm* — Michael Best & Friedrich LLP

(57) ABSTRACT

A cold trap includes two individually controllable cooling units. The cold trap is provided in an evacuation path for connecting a vacuum chamber to a turbomolecular pump. The first cooling unit includes a first panel unit provided in the evacuation path such that the panel is exposed, and a first refrigerator thermally coupled to the first panel unit so as to cool the first panel unit. The second cooling unit includes a second panel unit provided in the evacuation path such that the panel is exposed, and a second refrigerator thermally coupled to the second panel unit so as to cool the second panel unit. The first panel unit is spaced apart from the second panel unit.

4 Claims, 5 Drawing Sheets

COLD TRAP AND METHOD OF CONTROLLING COLD TRAP

BACKGROUND

1. Technical Field

The present invention relates to a cold trap and a method of controlling the cold trap.

2. Description of the Related Art

Cryopanels and cold traps are known as apparatus for evacuating by condensing and adsorbing gas molecules on a cryopanel cooled to an extremely low temperature. Normally, a cold trap is provided in a stage preceding a vacuum pump in a turbomolecular pump and is used in combination with a vacuum pump for evacuation. Normally, a cooling apparatus such as a system for supplying a cooling fluid or a cryogenic refrigerator is provided in association with the cold trap so that the surface of the cryopanel is cooled to a cryogenic temperature.

SUMMARY

One embodiment of the present invention relates to a cold trap. The cold trap includes a plurality of individually controllable cooling units and provided in an evacuation path for connecting a volume subject to evacuation to a vacuum pump, wherein each cooling unit includes: a panel unit provided in the evacuation path such that the panel is exposed; and a refrigerator thermally coupled to the panel unit and configured to cool the panel unit. The panel unit of each cooling unit is spaced apart from the panel unit of another cooling unit.

Another embodiment of the present invention relates to a control method. The method controls a cold trap including a plurality of individually controllable cooling units and provided in an evacuation path for connecting a volume subject to evacuation to a vacuum pump, each cooling unit including: a panel unit provided in the evacuation path such that the panel is exposed; and a refrigerator thermally coupled to the panel unit and configured to cool the panel unit. The panel unit of each cooling unit is spaced apart from the panel unit of another cooling unit. The control method includes: switching between a normal operation mode and a regeneration mode, the normal operation mode being configured to freeze and capture gas arriving from the volume subject to evacuation via the evacuation path on the surface of the panel unit, and the regeneration mode being configured to vaporize the gas frozen on the surface of the panel unit and discharge the gas outside using a vacuum pump; and placing at least one of the plurality of cooling units in the regeneration mode while another cooling unit is in the normal operation mode.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention but to exemplify the invention. The size of the component in each figure may be changed in order to aid understanding. Some of the components in each figure may be omitted if they are not important for explanation.

In general, the larger the amount of moisture, etc. captured on the surface of a cryopanel of a cold trap, the lower the evacuation performance. It is therefore necessary to perform a regeneration process periodically to discharge captured moisture, etc., outside. During the regeneration process, moisture, etc. is revaporized from the cryopanel so that the cold trap is often isolated from the target subject to evacuation for evacuation by using a valve or the like, or the operation of the entirety of the device including the cold trap is often suspended. In the former case, a negative impact on the vacuum degree is of a concern. In the latter case, lowering of the use efficiency of the device to which the cold trap is attached is a concern.

One of the needs addressed by the present invention is to provide a cold trap capable of continuous operation and a method of controlling such a cold trap.

The cold trap according to the embodiment uses a plurality of refrigerators. The cryopanel of the cold trap is divided in association with the respective refrigerators. Each panel unit produced by the division is spaced apart from any of the other panel units. This allows the panel units to be regenerated individually and enables continuous operation of the cold trap. As a result, the productivity of production equipment that uses such a cold trap is improved.

For example, a cold trap is used to evacuate the vacuum chamber of a vacuum treatment device for treating an object in a vacuum environment. For example, a vacuum treatment device is a device used in a semiconductor manufacturing step performed in an ion implantation device or a sputtering device, etc. Recently, vacuum treatment devices are available in larger sizes than before in association with larger sizes of liquid crystal displays and electro-luminescence displays. In a vacuum treatment device with a large vacuum chamber, a large-sized cold trap having higher evacuation performance is often used.

Normally, a large-sized cold trap yields high cooling performance necessary to cool a large cryopanel by using a plurality of refrigerators. If the technical idea according to the embodiment is applied to large-sized cold traps, the plurality of refrigerators can be used for the purpose of enabling continuous operation of the cold trap in addition to the purpose of achieving high cooling performance. Therefore, the technical idea according to the embodiment can be suitably applied to relatively large-sized cold traps.

Figure 1:
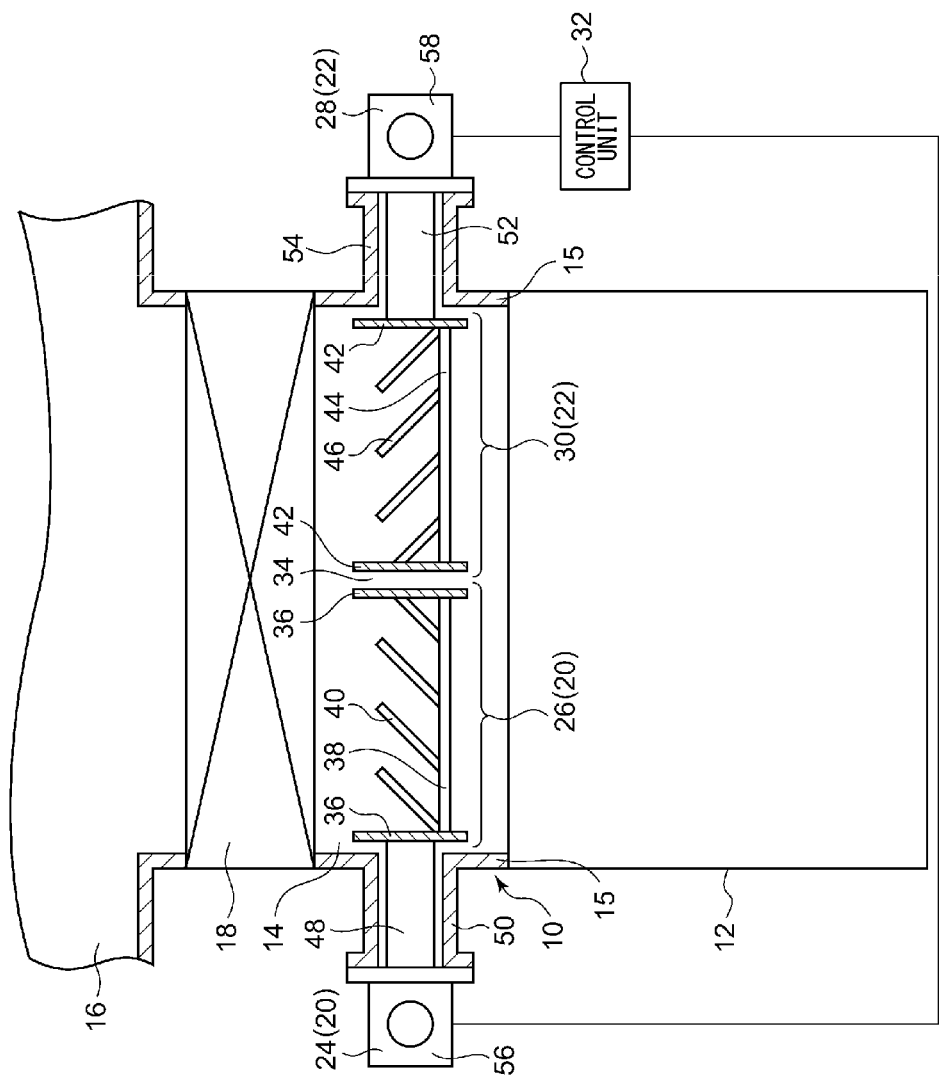
FIG. 1 schematically shows an evacuation system provided with the cold trap according to one embodiment of the present invention.

FIG. 1 schematically shows an evacuation system provided with a cold trap 10 according to one embodiment of the present invention. The evacuation system is provided with a cold trap 10 and a turbomolecular pump 12. The turbomolecular pump 12 is connected to a vacuum chamber 16 of a vacuum processing apparatus via an evacuation path 14 bounded by a vacuum container 15. The cold trap 10 is provided in front of the turbomolecular pump 12 in the evacuation path 14. The cold trap 10 is provided above the turbomolecular pump 12 in the vertical direction.

A gate valve 18 for shielding the evacuation system from the vacuum chamber 16 is provided in the evacuation path 14. The gate valve 18 is provided between the opening of the vacuum chamber 16 and the cold trap 10. By opening the gate valve 18, the evacuation system communicates with the vacuum chamber 16 so as to allow the vacuum chamber 16 to be evacuated. By closing the gate valve 18, the evacuation system is disconnected from the vacuum chamber 16. The gate valve 18 may constitute the evacuation system. Alternatively, the gate valve may be provided at the opening of the vacuum chamber 16 as part of the vacuum processing apparatus.

The evacuation system evacuates the vacuum chamber 16 to increase the degree of vacuum to a desired level by opening the gate valve 18 and operating the turbomolecular pump 12. In this process, at least a part of the cold trap 10 is cooled to a temperature (e.g., 100 K) capable of capturing water vapor flowing in the evacuation path 14. Normally, the evacuation speed of the turbomolecular pump 12 for evacuating water vapor is relatively low. However, a larger evacuation speed is achieved by using the cold trap 10 in combination.

Figure 2:
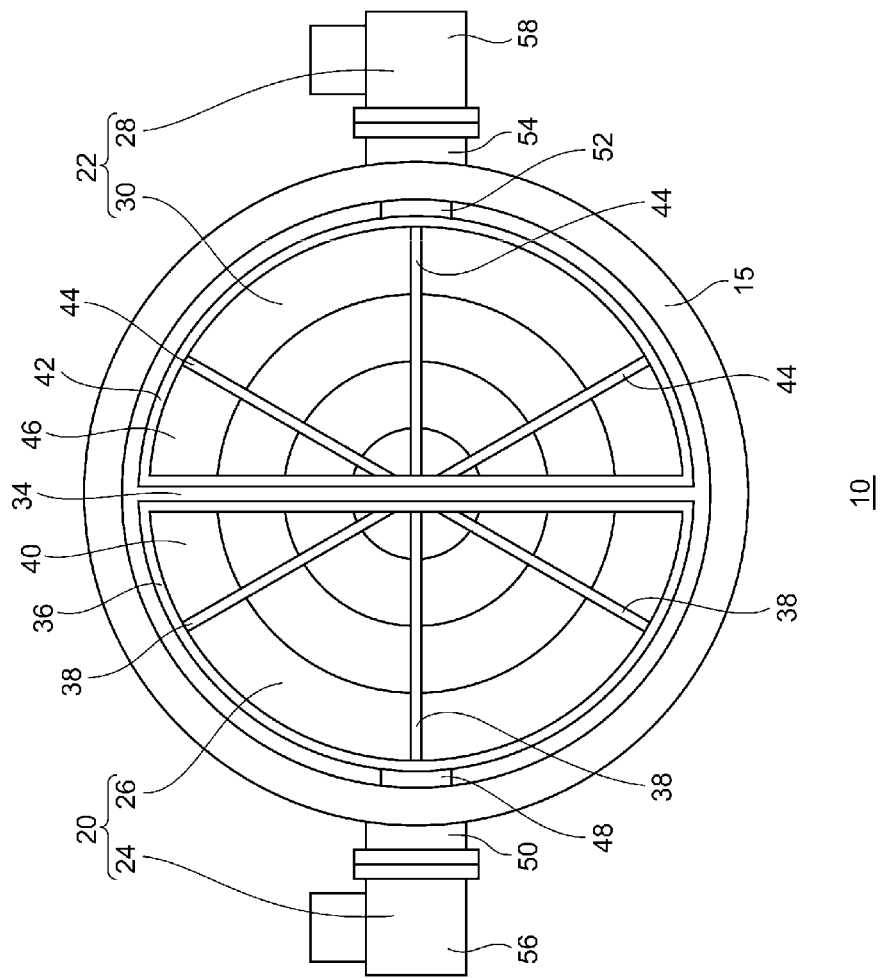
FIG. 2 shows the bottom of the cold trap of FIG. 1.

FIG. 2 shows the bottom of the cold trap 10. A description will now be given of the cold trap 10 with reference to FIGS. 1 and 2. The cold trap 10 includes a first cooling unit 20, a second cooling unit that can be controlled independent of the first cooling unit 20, and a control unit 32 connected to the first and second cooling units 20 and 22. The first cooling unit 20 and the second cooling unit 22 are adjacent to each other. The first cooling unit 20 includes a first refrigerator 24 and a first panel unit 26 having a louver structure. The second cooling unit 22 includes a second refrigerator 28 and a second panel unit 30 having a louver structure.

The first and second panel units 26 and 30 are located in the evacuation path 14 such that the panel units are exposed. The first panel unit 26 and the second panel unit 30 are spaced apart from each other in a direction perpendicular to the direction of gas flow in the evacuation path 14 (the vertical direction in FIG. 1 and the direction perpendicular to the paper surface of FIG. 2). In particular, the first panel unit 26 and the second panel unit 30 are provided along a plane perpendicular to the direction of gas flow, producing a predetermined gap 34. The areas of the first and second panel units 26 and 30 projected in the direction of gas flow are set so as to occupy the majority of the cross sectional area perpendicular to the direction of gas flow in the evacuation path 14. The first and second panel units 26 and 30 face each other in a direction perpendicular to the direction of gas flow.

The first refrigerator 24 is thermally coupled to the first panel unit 26 so as to cool the first panel unit 26. The second refrigerator 28 is thermally coupled to the second panel unit 30 so as to cool the second panel unit 30. The first and second panel units 26 and 30 freeze and capture a portion of the gas flowing in the evacuation path 14 by being cooled by the first and second refrigerators 24 and 28, respectively.

The first panel unit 26 has a first housing 36, three first heat transfer bars 38, and 16 first louver boards 40. The first housing 36 is configured to define the outer form of the area that the first panel unit 26 should occupy in the cross section of the evacuation path 14. More particularly, the first housing 36 is formed in a semicircular shape. The first heat transfer bars 38 are bonded to the first housing 36 by, for example, welding. The first louver boards 40 are bonded to the respective first heat transfer bars 38 by, for example, welding. The first louver boards 40 are formed like sides of truncated cones having different diameters and are concentrically arranged. Similarly, the second panel unit 30 has a second housing 42, three second heat transfer bars 44, and 16 second louver boards 46. The first and second panel units 26 and 30 may be in a chevron formation or may form a lattice or other shape.

Openings are formed in the evacuation path 14 at positions coinciding with the first and second refrigerators 24 and 28. A first coupling housing 50 and a second coupling housing 54 for respectively accommodating a first cylinder 48 of the first refrigerator 24 and a second cylinder 52 of the second refrigerator 28 are mounted in the respective openings.

The first refrigerator 24 is a Gifford-McMahon refrigerator (so-called a GM refrigerator). The firs refrigerator 24 is a single-stage refrigerator and is provided with the first cylinder 48 and a first refrigerator motor 56. The first housing 36 is mounted at one end of the first cylinder 48. The first refrigerator motor 56 is provided at the other end of the first cylinder 48. A displacer (not shown) is built in the first cylinder 48 and a regenerator material (not shown) is built in the displacer. The first refrigerator motor 56 is connected to the displacer so that the displacer can make a reciprocal movement inside the first cylinder 48. The first refrigerator motor 56 is also connected to a movable valve (not shown) provided inside the first refrigerator 24 so as to drive the valve into normal and reverse rotation.

A compressor (not shown) is connected to the first refrigerator 24 via a high-pressure pipe and a low-pressure pipe. The first refrigerator 24 deprives heat from the first panel unit 26 by repeating heat cycles whereby a high-pressure operating gas (e.g., helium) supplied from the compressor is expanded inside the first refrigerator 24 and then discharged. The first refrigerator motor 56 rotates the movable valve in a predetermined direction so as to achieve the heat cycle. The compressor collects the operating gas discharged from the first refrigerator 24 and increases its pressure before supplying it the first refrigerator 24 again. By allowing the first refrigerator motor 56 to rotate the movable valve in a reverse direction, a heat cycle produced by reversing the above heat cycle is achieved so that the first panel unit 26 is heated. Instead of or in addition to reverse rotation operation of the first refrigerator 24, the first cold panel unit 26 may be heated by using a heating means such as a heater.

A temperature sensor (not shown) is provided at one end of the first cylinder 48 of the first refrigerator 24. The temperature sensor periodically measures the temperature of the one end of the first cylinder 48 and outputs a signal indicating the measured temperature to the control unit 32. The temperature sensor is connected to the control unit 32 so that an output of the sensor can be communicated to the control unit 32. The one end of the first cylinder 48 and the panel unit 26 are formed as one piece thermally. Therefore, the measured temperature from the temperature sensor indicates the temperature of the first panel unit 26. The temperature sensor may be provided in the first panel unit 26.

A pressure sensor (not shown) is provided inside the first coupling housing 50. The pressure sensor periodically measures the internal pressure of the first coupling housing 50, i.e., the pressure in the evacuation path 14, and outputs a signal indicating the measured pressure to the control unit 32. The pressure sensor is connected to the control unit 32 so that an output of the sensor can be communicated to the control unit 32. The pressure sensor may measure the pressure only during a regeneration process of the cold trap 10 and output the result to the control unit 32. The measured value from the pressure sensor indicates the pressure around the first panel unit 26, i.e., the ambient pressure. The pressure sensor may be provided in the evacuation path 14.

The pressure sensor 40 has a wide measurement range extending from atmospheric pressure to about 0 Pa. Desirably, the sensor includes in its measurement range at least a pressure range that could occur during a regeneration process. Desirably, the pressure sensor is at least capable of measuring a pressure occurring when the gas flow in the evacuation path 14 is a viscous flow. The pressure sensor may also be capable of measuring a pressure irrespective of whether the gas flow in the evacuation path 14 is a viscous flow or a molecular flow. Generally, the gas flow will be a viscous flow if the pressure in the evacuation path 14 is higher than several Pa. The gas flow will be a molecular flow if the pressure is smaller than 10-1-10-2 Pa. For example, a crystal gauge may be used as a sensor that meets the requirement. A crystal gauge is a sensor for measuring a pressure by using a phenomenon whereby vibration resistance of a crystal oscillator varies with pressure. A Baratron vacuum gage may be used alternatively. Still alternatively, a pressure sensor capable of measuring only the pressure of a molecular flow is used (e.g., a T/C gauge).

The second refrigerator 28 is configured similarly as the first refrigerator 24 and is provided with a second cylinder 52 and a second refrigerator 58. The second housing 42 is mounted at one end of the second cylinder 52. The second refrigerator motor 58 is provided at the other end of the second cylinder 52.

The control unit 32 is formed as a microprocessor including a CPU. In addition to the CPU, the control unit 32 is provided with a ROM for storing programs, a RAM for temporarily storing data, an input and output port, and a communication port. The control unit 32 is connected to the controller of the vacuum processing apparatus and capable of communicating therewith. The control unit 32 is also capable of executing proper control in accordance with an instruction from the controller of the vacuum processing apparatus. The control 32 controls the first and second refrigerators 24 and 28 based on the measured value fed from the temperature sensor and the pressure sensor. The control unit 32 is connected to the first and second refrigerator motors 56 and 58 and capable of communicating therewith.

An inverter (not shown) is provided between the control unit 32 and the first refrigerator motor 56. The revolution of the first refrigerator motor 56 is controlled by supplying an instruction from the control unit 32 to the inverter. By changing the revolution of the first refrigerator motor 56, the frequency of heat cycles in the first refrigerator 24 is changed so that the temperature of the first panel unit 26 varies. An inverter (not shown) is also provided between the control unit 32 and the second refrigerator motor 58.

At least two control modes of the first cooling unit 20 are available.

(1) Normal operation mode in which the first cooling unit 20 is controlled to freeze and capture the gas arriving from the vacuum chamber 16 via the evacuation path 14 on the surface of the first panel unit 26. In the normal operation mode, the control unit 32 controls a first refrigerator motor 56 in accordance with the temperature measured by the temperature sensor so that the temperature of the first panel unit 26 matches a target temperature (e.g., 100K). For example, the control unit 32 determines the revolution of the first refrigerator motor 56 so that the temperature measured by the temperature sensor approaches the target temperature. For example, when the measured temperature is higher than the target temperature, the control unit 32 increases the revolution of the first refrigerator 56. When the measured temperature is lower than the target temperature, the control unit 32 decreases the revolution of the first refrigerator 56. In this way, the temperature of the first panel unit 26 is maintained near the target temperature.

(2) Regeneration mode in which the first cooling unit 20 is controlled to vaporize the gas frozen on the surface of the first panel unit 26 and discharge the gas outside using the turbomolecular pump 12. By continuing the normal operation mode, a stack of frozen gas will be built on the first panel unit 26. In particular, the amount of ice formed by solidified vapor will be primarily increased, according to the embodiment. Therefore, the first cooling unit 20 is regenerated when a predetermined operation time has elapsed since the start of the normal operation mode, in order to discharge the stack of ice outside. When the first cooling unit 20 is placed in the regeneration mode, the control unit 32 maintains the second cooling unit 22 in the normal operation mode. Therefore, impact on the vacuum degree in the vacuum chamber 16 is relatively small even if the first cooling unit 20 is regenerated while the gate valve 18 is maintained open.

In the regeneration mode, the temperature of the first panel unit 26 is raised to a regeneration temperature higher than the target temperature of the first panel unit 26 in the normal operation mode, and the gas frozen on the surface is revaporized. A portion of the revaporized gas is captured by the second panel unit 30 of the second cooling unit 22 maintained in the normal operation mode. Most of the remainder is discharged outside by the turbomolecular pump 12. A vacuum pump other than a turbomolecular pump may be provided for a regeneration process and used to discharge the gas outside. As in the case of the first cooling unit 20, at least two control modes are available for the second cooling unit 22.

The control unit 32 switches the control mode of the cooling units 20 and 22 individually between the normal operation mode and the regeneration mode. In particular, the control unit 32 controls the first and second cooling units 20 and 22 such that the units do not enter the regeneration mode concurrently. In other words, the control unit 32 places one of the cooling units in the regeneration mode on the condition that the other cooling unit is in the normal operation mode. It can be said that the control unit 32 controls the cooling units so that at least one of the first and second cooling units 20 and 22 continues to be in the normal operation mode.

A description will now be given of the operation of the cold trap 10 having the structure as described above.

Figure 3:
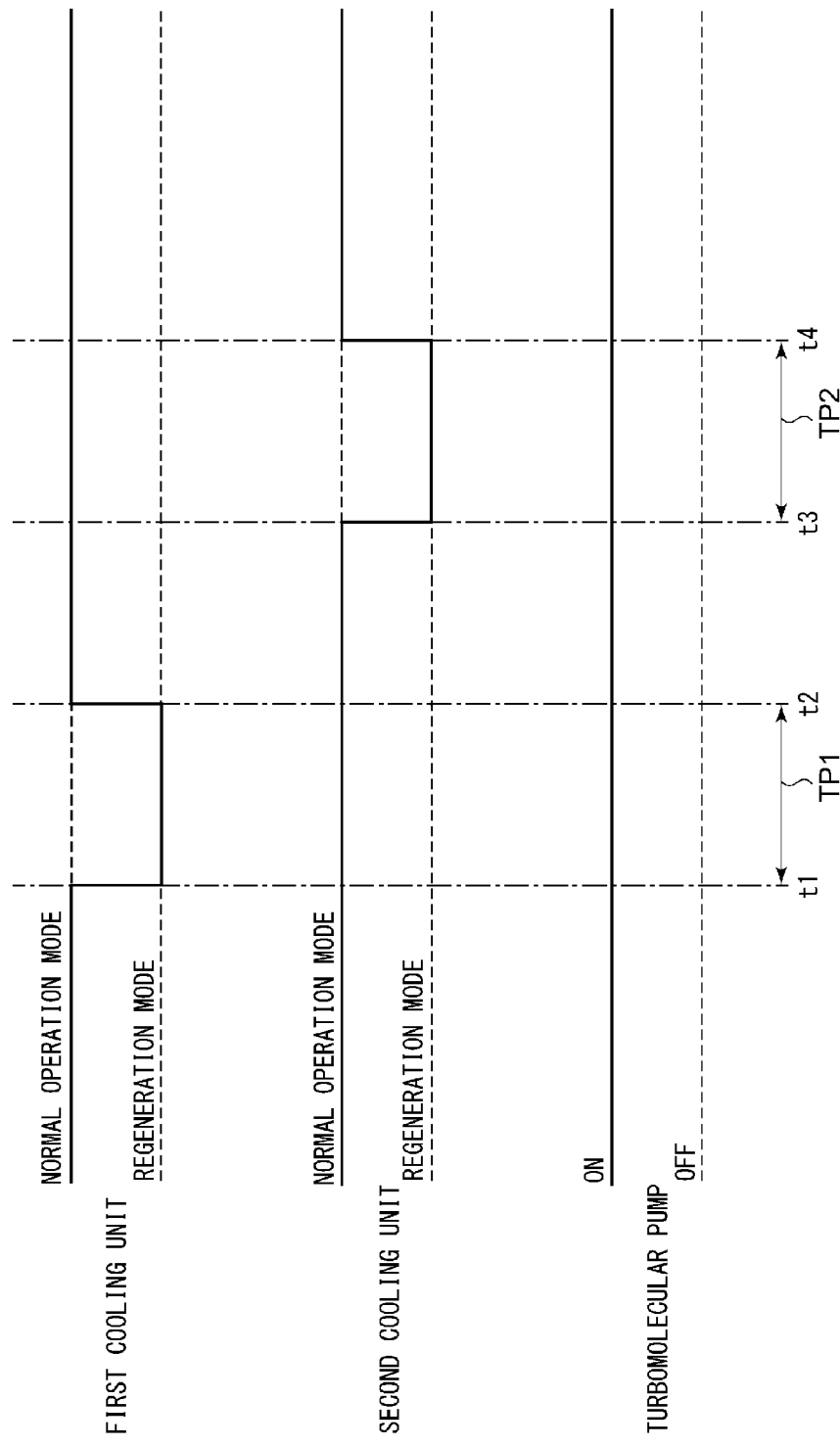
FIG. 3 is a time chart showing transition between operating statuses of the first cooling unit, the second cooling unit, and the turbomolecular pump of FIG. 1.

FIG. 3 is a time chart showing transition between operating statuses of the first cooling unit 20, the second cooling unit 22, and the turbomolecular pump 12. The turbomolecular pump 12 is always turned on.

At time t1, the control unit 32 detects that the operation time of the first cooling unit 20 expires and switches the control mode of the first cooling unit 20 from the normal operation mode to the regeneration mode. The control unit 32 maintains the second cooling unit 22 in the normal operation mode. If the second cooling unit 22 is in the regeneration mode when the operation time of the first cooling unit 20 expires, the control unit 32 maintains the first cooling unit 20 in the normal operation mode until the second cooling unit 22 returns to the normal operation mode. Once the second cooling unit 22 is in the normal operation mode, the control unit 32 switches the control mode of the first cooling unit 20 from the normal operation mode to the regeneration mode.

During a cooling unit regeneration period TP1 between time t1 and time t2, the control unit 32 places the first cooling unit 20 in the regeneration mode and maintains the second cooling unit 22 in the normal operation mode. At time t2, the control unit 32 switches the control mode of the first cooling unit 20 from the regeneration mode to the normal operation mode.

At time t3, the control unit 32 detects that the operation time has elapsed and switches the control mode of the second cooling unit 22 from the normal operation mode to the regeneration mode. The control unit 32 maintains the first cooling unit 20 in the normal operation mode. If the first cooling unit 20 is in the regeneration mode when the operation time of the second cooling unit 22 expires, the same operation as performed at time t1 is performed. During a cooling unit regeneration period TP2 between time t3 and time t4, the control unit 32 places the second cooling unit 22 in the regeneration mode and maintains the first cooling unit 20 in the normal operation mode. At time t4, the control unit 32 switches the control mode of the second cooling unit 22 from the regeneration mode to the normal operation mode.

The control unit 32 may adjust the operation time of the cooling units such that the regeneration time TP1 of the first cooling unit does not overlap the regeneration time TP2 of the second cooling unit.

According to the cold trap of the embodiment, the cold trap 10 can be operated continuously without providing a regeneration time for the cold trap 10 itself, by taking advantage of the provision of the two refrigerators 24 and 28. This reduces negative impact on the vacuum degree of the vacuum chamber 16 resulting from closing the gate valve 18 when the cold trap is regenerated. In an application not provided with the gate valve 18, there is no need to stop the operation of the device as a whole, including the vacuum chamber 16, in order to regenerate the cold trap 10. All these contribute to improvement in the productivity of the device.

In the cold trap 10 according to the embodiment, no other cooling units are located between the cooling units 20, 22 and the turbomolecular pump 12. The cooling units 20 and 22 directly face the turbomolecular pump 12. Therefore, most of the revaporized gas is discharged outside by the turbomolecular pump 12 in the regeneration mode both in the first and second cooling units 20 and 22. As a result, the cooling units 20 and 22 can be regenerated efficiently.

In contrast, when a part of the cryopanel is cooled and another part is heated in a cryopanel system in which the cryopanel is somewhat spaced apart from a vacuum pump, most of the gas revaporized from the heated part is captured by the cooled part. Therefore, effective regeneration of the cryopanel is not realistic.

Described above is the structure and operation of the cold trap 10 according to the embodiment. The embodiment is intended to be illustrative only and it will be obvious to those skilled in the art that various modifications to constituting elements and processes could be developed and that such modifications are also within the scope of the present invention.

The first cooling unit according to the embodiment may include a gap cover thermally coupled to the first housing 36 and spaced apart from the second panel unit 30. The gap cover may cover at least a part of the gap 34.

Figure 4:
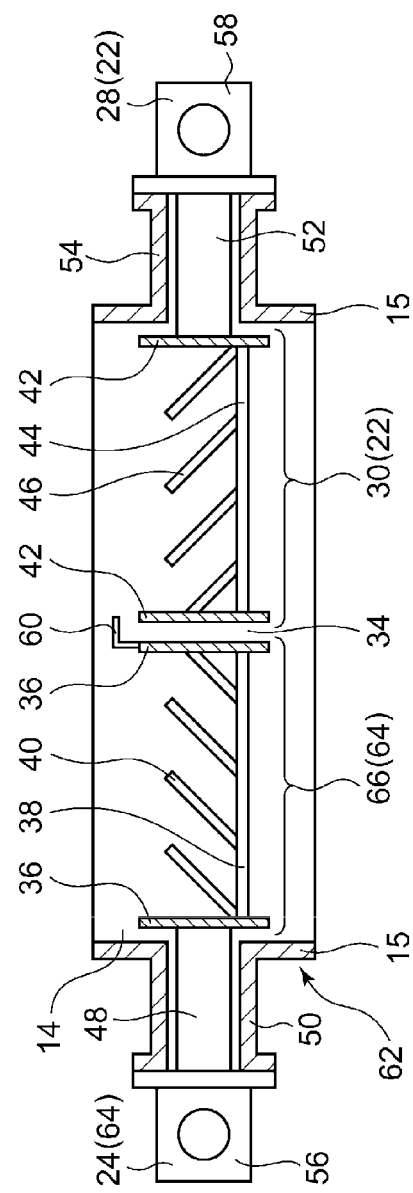
FIG. 4 schematically shows a cold trap according to the first variation.

FIG. 4 schematically shows a cold trap 62 according to the first variation. The cold trap 62 includes a first cooling unit 64 and a second cooling unit 22, and the first cooling unit 64 includes a first refrigerator 24 and a first panel unit 66. The first panel unit 66 has a first housing 36, three first heat transfer bars 38, 16 first louver boards 40, and a gap cover 60. The gap cover 60 is attached to the top end of the part that defines the gap 34 of the first housing 36. The gap cover 60 covers the gap 34 so as to hide the gap 34 when the cold trap 62 is viewed from the side of the gate valve 18.

In this case, the gap cover 60 is also cooled in the normal operation mode of the first cooling unit 64 and the gap arriving from the evacuation path 14 could be captured by the gap cover 60. This can increase the amount of captured gas accordingly. The gap cover 60 may be attached to the second housing 42.

The panel unit according to the embodiment is described as having a louver structure. Alternatively, the technical idea of the embodiment can be applied to a cryopanel having a cylindrical cryopanel described in, for example, U.S. Pat. No. 5,483,803.

Figure 5:
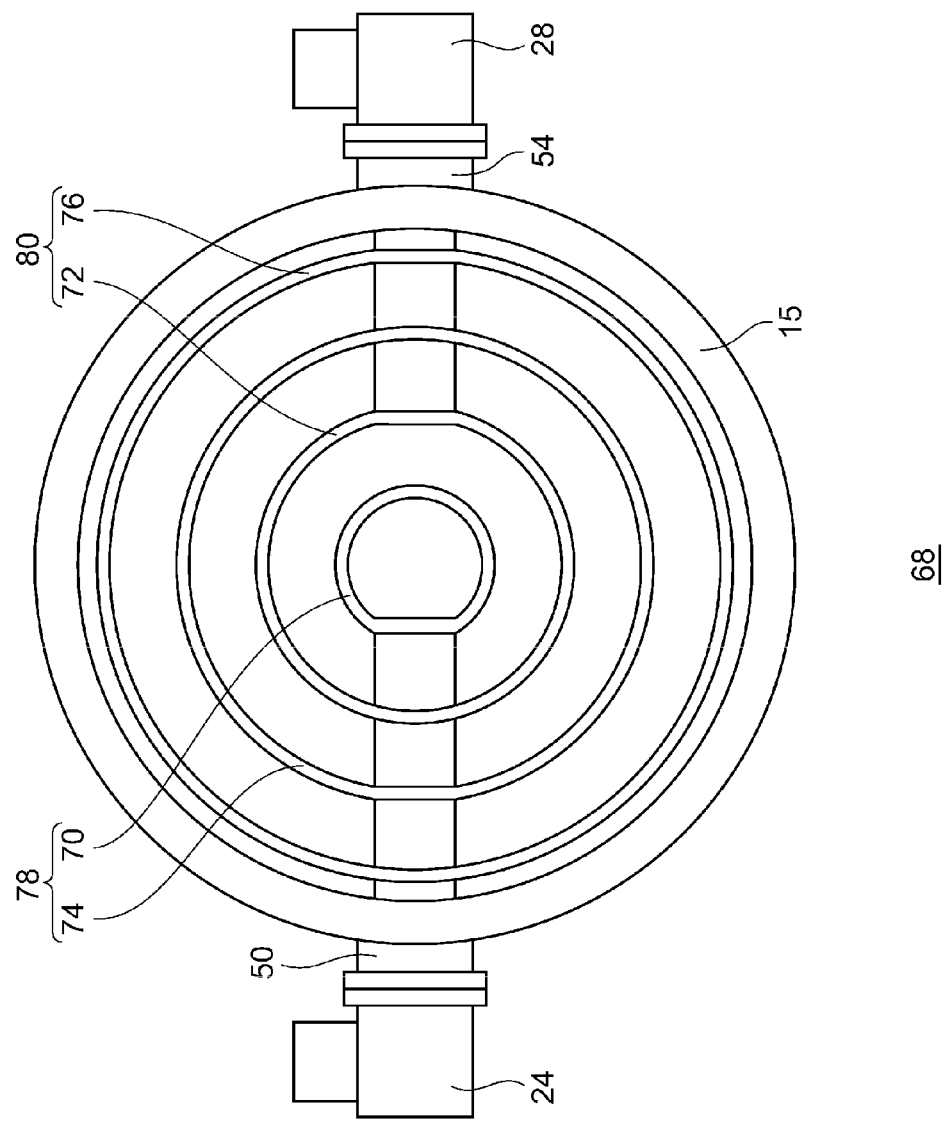
FIG. 5 shows the bottom of a cold trap according to the second variation.

FIG. 5 shows the bottom of a cold trap 68 according to the second variation. The cold trap 68 includes four cylindrical panels 70, 72, 74, and 76 arranged concentrically so as not to be in contact with each other. The first panel 70, the second panel 72, the third panel 73, and the fourth panel 76 are arranged in the stated order from inside to outside. The first and third panels 70 and 73 form a first panel unit 78 and are thermally coupled to and cooled by the first refrigerator 24. The second and fourth panels 74 and 76 form a second panel unit 80 and are thermally coupled to and cooled by the second refrigerator 28. The first panel unit 78 and the second panel unit 80 are spaced apart in a direction perpendicular to the direction of gas flow. In this case, the same advantage as provided by the cold trap 10 according to the embodiment is provided.

The cold trap 10 according to the embodiment is described as being provided with two cooling units. Alternatively, the cold trap may be provided with three or more independently controllable cooling units.

It should be understood that the invention is not limited to the above-described embodiment, but may be modified into various forms on the basis of the spirit of the invention. Additionally, the modifications are included in the scope of the invention.

Priority is claimed to Japanese Patent Application No.2012-018835, filed Jan. 31, 2012, the entire content of which is incorporated herein by reference.

What is claimed is:

1. A cold trap comprising a plurality of individually controllable cooling units and provided in an evacuation path for connecting a volume subject to evacuation to a vacuum pump, wherein each cooling unit includes:
   a panel unit provided in the evacuation path such that the panel is exposed; and
   a refrigerator thermally coupled to the panel unit and configured to cool the panel unit, and
   wherein the panel unit of each cooling unit is spaced apart from the panel unit of another cooling unit,
   wherein the cold trap further comprises a cover unit thermally coupled to at least one of two adjacent panel units and configured to cover at least a part of a gap between the two panel units.

2. The cold trap according to claim 1, further comprising:
   a control unit configured to switch between a normal operation mode and a regeneration mode, the normal operation mode being configured to freeze and capture gas arriving from the volume subject to evacuation via the evacuation path on the surface of the panel unit, and the regeneration mode being configured to vaporize the gas frozen on the surface of the panel unit and discharge the gas outside using a vacuum pump,
   wherein the control unit places at least one of the plurality of cooling units in the regeneration mode while another cooling unit is in the normal operation mode.

3. The cold trap according to claim 1, wherein the panel units of the cooling units are provided along a cross-section of the evacuation path perpendicular to a gas flow direction through the evacuation path.

4. The cold trap according to claim 1, wherein adjacent panel units are thermally isolated from each other by a gap between the adjacent panel units.

\* \* \* \* \*